(12) United States Patent
Boyko

(10) Patent No.: US 7,640,719 B2
(45) Date of Patent: Jan. 5, 2010

(54) ROTARY MOWER OVER-CENTER SELF-LOCKING WING LIFT

(75) Inventor: Stanley Joseph Boyko, Wakaw (CA)

(73) Assignee: Batoche AG - Design (CA)

( * ) Notice: Subject to any disclaimer, the term of this patent is extended or adjusted under 35 U.S.C. 154(b) by 0 days.

(21) Appl. No.: 11/940,997

(22) Filed: Nov. 15, 2007

(65) Prior Publication Data
US 2008/0250767 A1    Oct. 16, 2008

(30) Foreign Application Priority Data
Apr. 10, 2007    (CA)    ................................ 2585274

(51) Int. Cl.
*A01D 34/00*    (2006.01)
(52) U.S. Cl. .......................... 56/13.6; 56/15.2
(58) Field of Classification Search ................. 56/13.6, 56/15.2, 15.9, 6
See application file for complete search history.

(56) References Cited

U.S. PATENT DOCUMENTS

| | | | | |
|---|---|---|---|---|
| 2,952,961 A | * | 9/1960 | Engler ........................ 56/13.6 |
| 3,500,619 A | * | 3/1970 | Bacon ............................. 56/6 |
| 4,429,515 A | * | 2/1984 | Davis et al. ...................... 56/6 |
| 4,497,160 A | * | 2/1985 | Mullet et al. ..................... 56/6 |
| 4,538,400 A | * | 9/1985 | Hottes ......................... 56/11.8 |
| 4,858,417 A | * | 8/1989 | Priefert et al. ................... 56/6 |
| 5,715,667 A | * | 2/1998 | Goman et al. ................. 56/13.6 |
| 5,771,669 A | * | 6/1998 | Langworthy et al. ............. 56/6 |
| 5,826,416 A | * | 10/1998 | Sugden et al. ............. 56/320.2 |
| 5,826,417 A | * | 10/1998 | Evans ........................ 56/320.2 |
| 6,494,026 B1 | * | 12/2002 | Schmidt ..................... 56/15.2 |
| 6,546,707 B2 | * | 4/2003 | Degelman et al. ............ 56/15.2 |
| 6,594,980 B2 | * | 7/2003 | Oka et al. ..................... 56/15.8 |
| 6,647,705 B2 | * | 11/2003 | Ewanochko et al. ......... 56/15.2 |
| 7,293,398 B2 | * | 11/2007 | Koehn ........................ 56/15.9 |
| 7,441,392 B2 | * | 10/2008 | Lilliestielke et al. ......... 56/15.9 |

* cited by examiner

*Primary Examiner*—Árpád Fábián-Kovács

(57) ABSTRACT

A wing-type rotary mower apparatus with a hydraulically powered over-center self-locking wing lift that extends between the central mower deck and the wing mower deck(s) to effect wing movement from a working position to a locked transport position. The lift mechanism comprises a double acting cylinder, a bell crank, and a pair of lift links that are pivotally connected. When the cylinder is retracted the bell crank rotates inward towards the center of the apparatus transferring the movement through the lift links to the mower wing(s). The rotational force on the bell crank about a fixed central pivot point on the central mower deck goes from an outward force reacted to by the cylinder to an inward force supported by the stop seat on the central mower deck; effectively locking the wing(s). The procedure is reversed when the cylinder is extended to return the wing(s) to the working position.

11 Claims, 5 Drawing Sheets

ROTARY MOWER OVER-CENTER SELF-LOCKING WING LIFT

This present invention pertains to a winged rotary mower apparatus with a hydraulically powered over-center self-locking wing lift mechanism whereby the wing or wings lift between a working position to a locked transport position.

BACKGROUND OF THE INVENTION

Rotary mowers comprising of a center section and one or two wings are used to maintain roadside ditches. In performing this job the mowers are required to travel many roadways including main highways and many well-traveled secondary roads. Due to transport and safety regulations and for convenience when transporting the wing(s) are folded up.

To meet this demand, conventionally, rotary mower wings fold up 90 degrees using a single acting hydraulic cylinder (retractable hydraulic actuator); gravity is relied on to lower them. They are then pinned in place in the vertical position for safety in transport. This method of lifting and lowering the wings causes both safety concerns and inconvenience to the operator. The use of a single acting hydraulic cylinder allows hydraulic creep. This places the operator in danger when applying or removing the pins because the hydraulic creep can cause binding making the task difficult while the operator relies on the tractor's passive hydraulic system to prevent the wing(s) from falling, presenting a potentially dangerous situation. When the wings are raised vertical to 90 degrees they often resist coming down especially if the mower is not on a perfectly level surface or the wing hinges bind due to rust and corrosion forcing the operator to manually push them down, again placing the operator in a potentially dangerous position. U.S. Pat. No. 6,647,705 Ewanocho et al. (CA 2391271) addresses one aspect of this problem with cushioning struts mounted across the wing hinge to assist in lowering the wings; but still a pin is used to lock them in an upright position.

It would be desirable to have a wing lift that would allow the operator to lift and lower the rotary mower wings without leaving the tractor, providing safety and convenience for the operator.

It would be desirable to have a wing lift that would allow the operator to raise the wings into a locked transport position without the operator leaving the tractor, providing safety and convenience for the operator.

BRIEF SUMMARY OF THE INVENTION

The invention in one broad aspect pertains to a rotary mower including a central section, having ground wheels, mowing deck, and a center section hinge. One or two wing section(s) having a ground wheel, mowing deck, and a wing hinge, hinged to the central section hinge on an axis for movement from an aligned working position through to a less then vertical transport position. A hydraulically powered over-center self-locking wing lift extends between the center section and the wing section to effect the wing movement.

It is the object of the present invention to provide a self-locking wing lift that enables the operator to safely and conveniently lower the rotary mower wing(s) into a working position and raise the rotary mower wing(s) into a locked transport position operative from the tractor seat.

The present invention provides a over-center self-locking wing lift mechanism comprising of a double acting cylinder (extensible and retractable hydraulic actuator) that is pivotally connected at an inner upper fixed point on the central mower deck on one end and it's rod end is pivotally connected to the center most point on a bell crank. The bell crank is pivotally connected at a second point about an outer lower fixed central pivot point on the center mower deck. The bell crank is pivotally connected at a third point to a pair of slotted lift links. The slotted lift links are pivotally connected at a second point to a fixed pivot point on the wing(s).

When the hydraulic cylinder retracts the bell crank rotates about the lower fixed central pivot point on the central mower deck inward towards the center of the apparatus; the opposing rotational force on the bell crank is outward towards the wing mower deck(s). The movement is transferred from the bell crank through the slotted lift links, to the wing section(s). This raises the wing(s) to a less then vertical position about the wing hinge axis between the wing section and center section. The center (neutral) position is reached where the pivotal connections on the pair of slotted lift links are in-line with the fixed central pivot point on the center section, at this position the rotational force caused by the wing load on the bell crank decreases to zero. The bell crank rotates inward from this position; to the over-center position; causing wing load to reverses from an outward rotational force on the bell crank to an inward rotational force on the bell crank about the fixed central pivot point on the central mower deck. At the over-center position both pivotal connections on the slotted lift links are below the fixed central pivot point on the central mower deck and the bell crank hits the stop seat on the central mower deck, locking the wing(s) in a less then vertical position.

Extending the cylinder causes the bell crank to rotate outward towards the wing section(s) about the outer lower fixed central pivot point on the central mower deck, lowering the wing(s) out of the locked position. The mechanism passes the center (neutral) position where the wing load on the bell crank switches to an outward rotational force about the outer lower fixed central pivot point on the central mower deck, and the wing(s) are lowered through the slotted lift links into the working position. The slotted lift links allows the wing(s) to float in the working position.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

Figure 1:
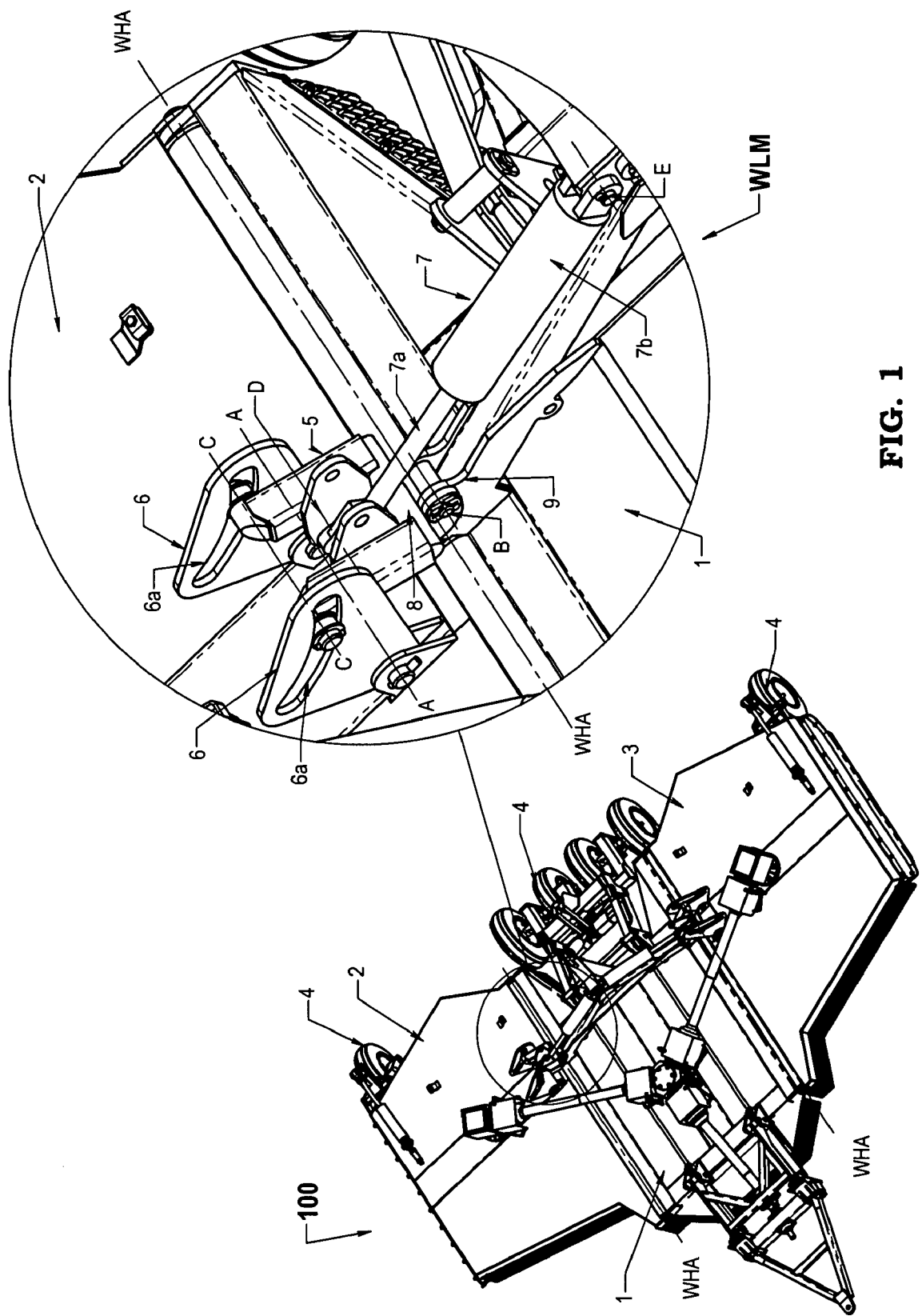
FIG. 1 is the overhead front perspective of a wing-type rotary mower apparatus showing the wing(s), center section, and the over-center self-locking wing lift mechanism of the invention. The mechanism is detailed.

Referring to FIG. 1 a wing-type rotary mower apparatus is illustrated. The wing-type rotary mower apparatus 100 adapted for attachment to a tractor for towing along the ground in an operating travel direction comprises, a central mower deck 1 and right and left wing mower deck 2, 3 pivotally attached to the wing hinge axes WHA respective right and left sides of central mower deck 1. Rear wheels 4 are mounted behind the mower decks 1, 2, 3 such that the mower decks 1, 2, 3 rides along the ground on the wheels. A cutting blade element is rotatably mounted under each mower deck 1, 2, 3 so as to rotate about right, left, and central substantially vertical blade axes. Two hydraulic powered over-center self-locking wing lift mechanisms WLM pivotally attached to the left and right side of the central mower deck 1 and to the wing mower decks 2, 3 to effect movement of the wing mower decks 2,3 from the working position illustrated in FIG. 2 to the over-center locked transport position illustrated in FIG. 5.

Figure 2:
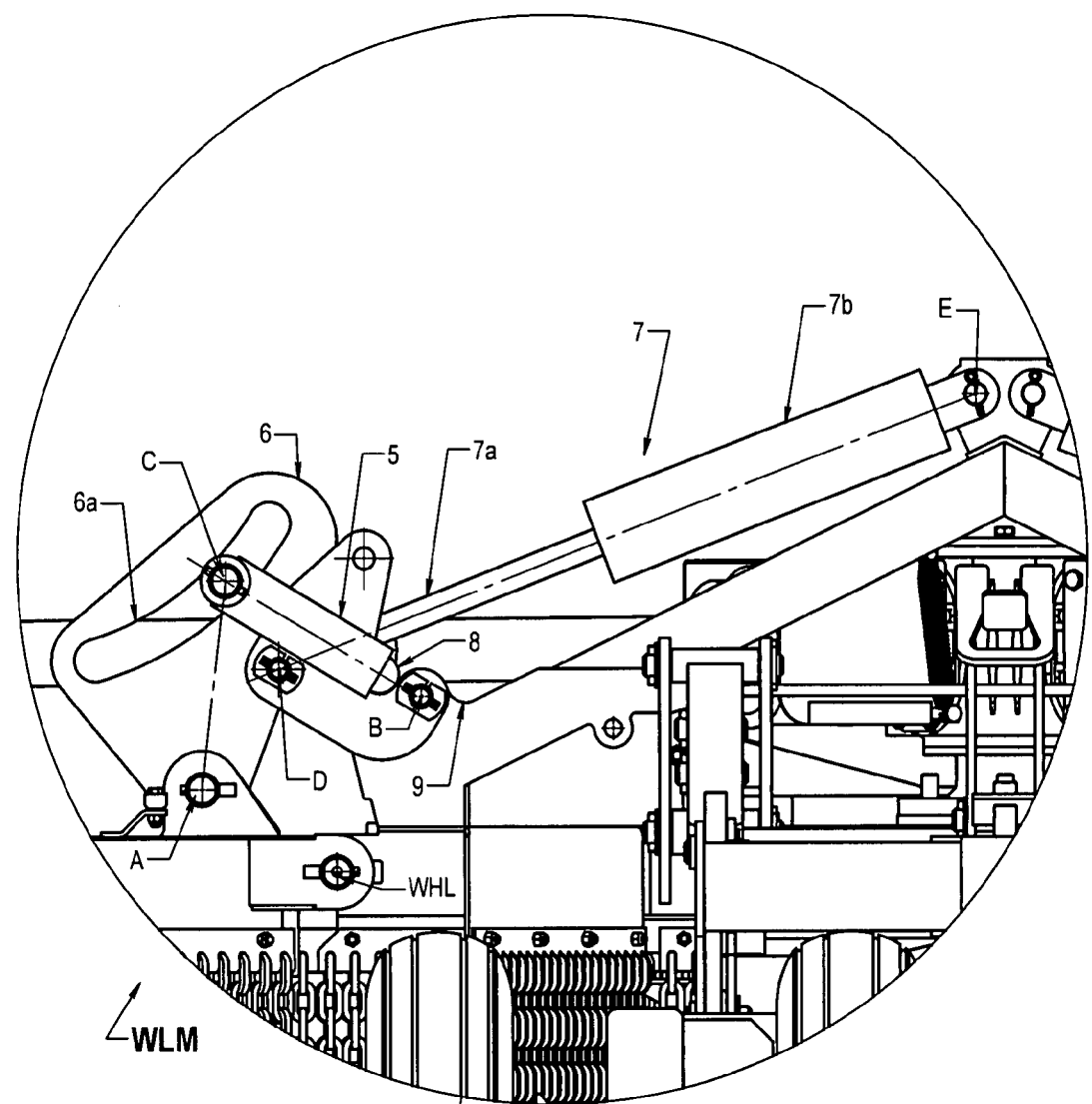
FIG. 2 is a back perspective of the embodiment of FIG. 1 showing the over-center self-locking wing lift mechanism wherein the mower is in the working position. Detail of the mechanism is shown with one rear slotted lift link remove.
Figure 2:
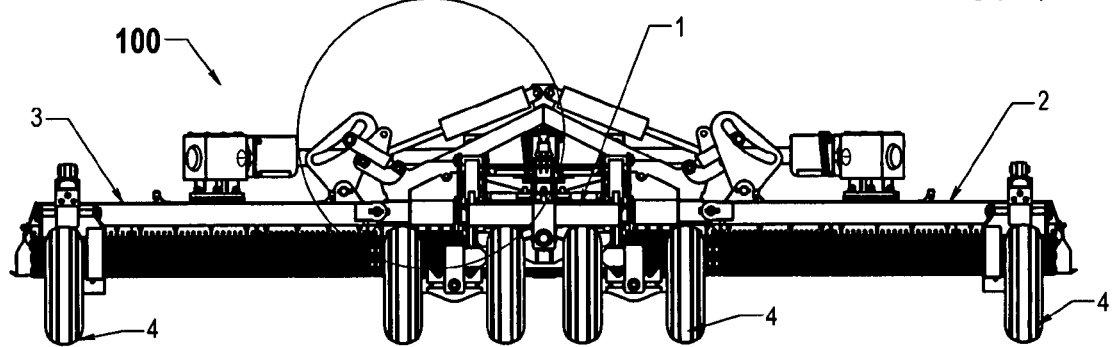
Figure 3:
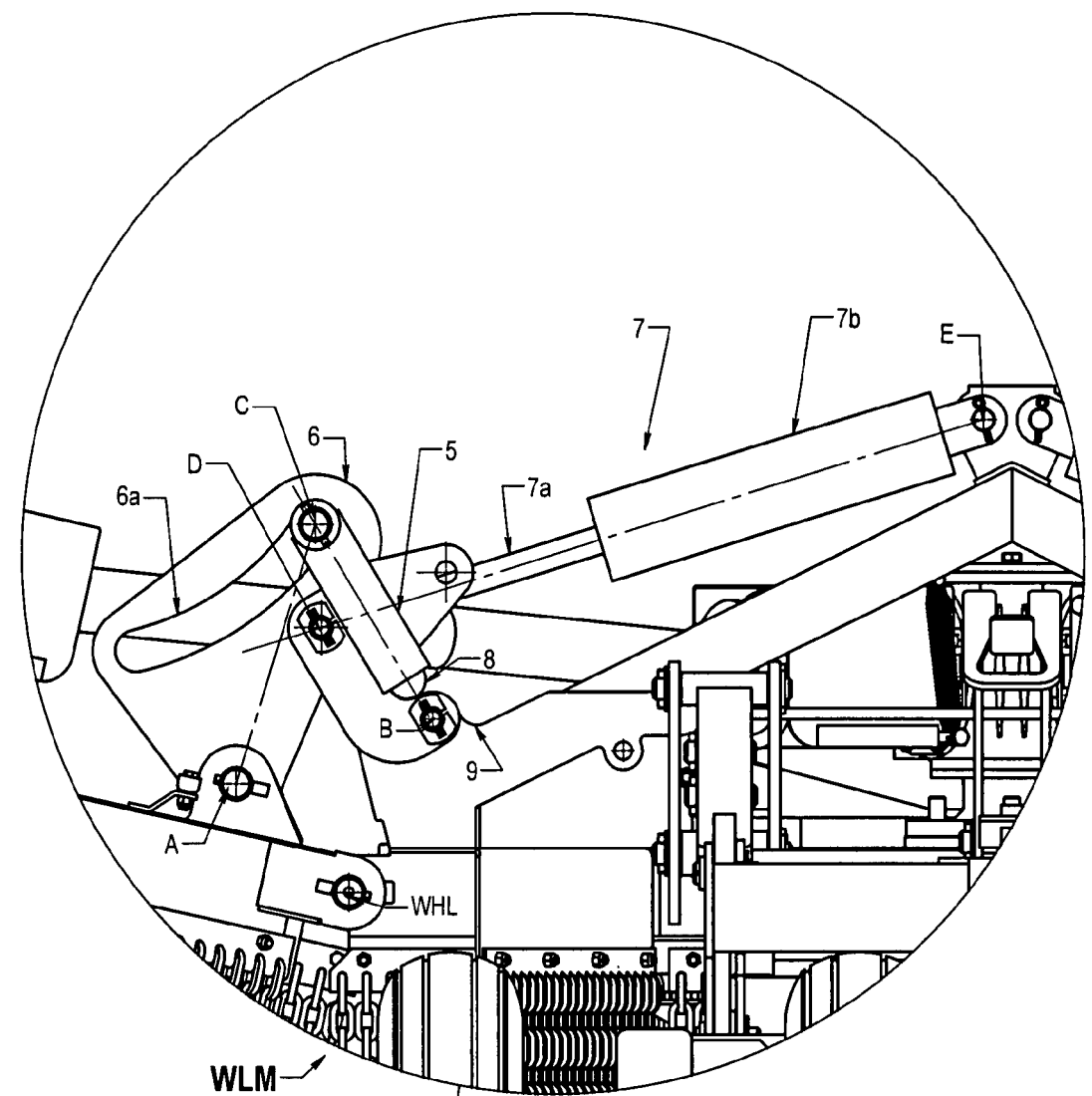
FIG. 3 is a back perspective of the embodiment of FIG. 1 showing the over-center self-locking wing lift mechanism wherein the mower first initiates the transport position. Detail of the mechanism is shown with one rear slotted lift link removed.
Figure 3:
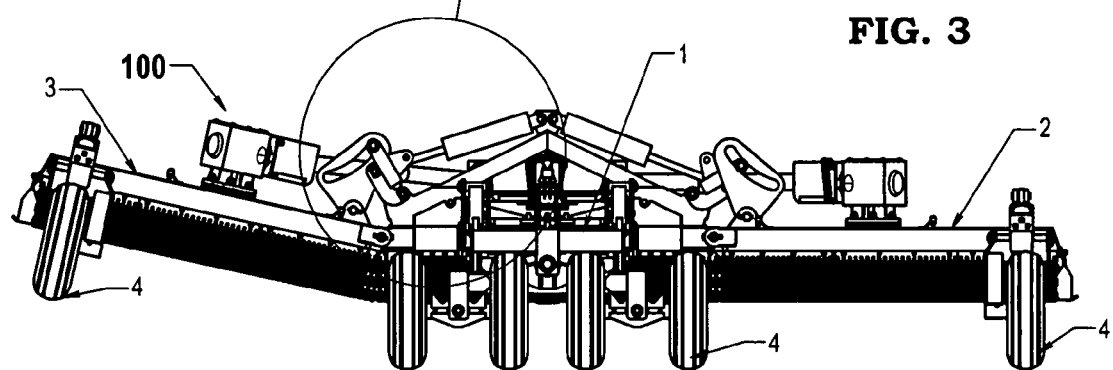
Figure 4:
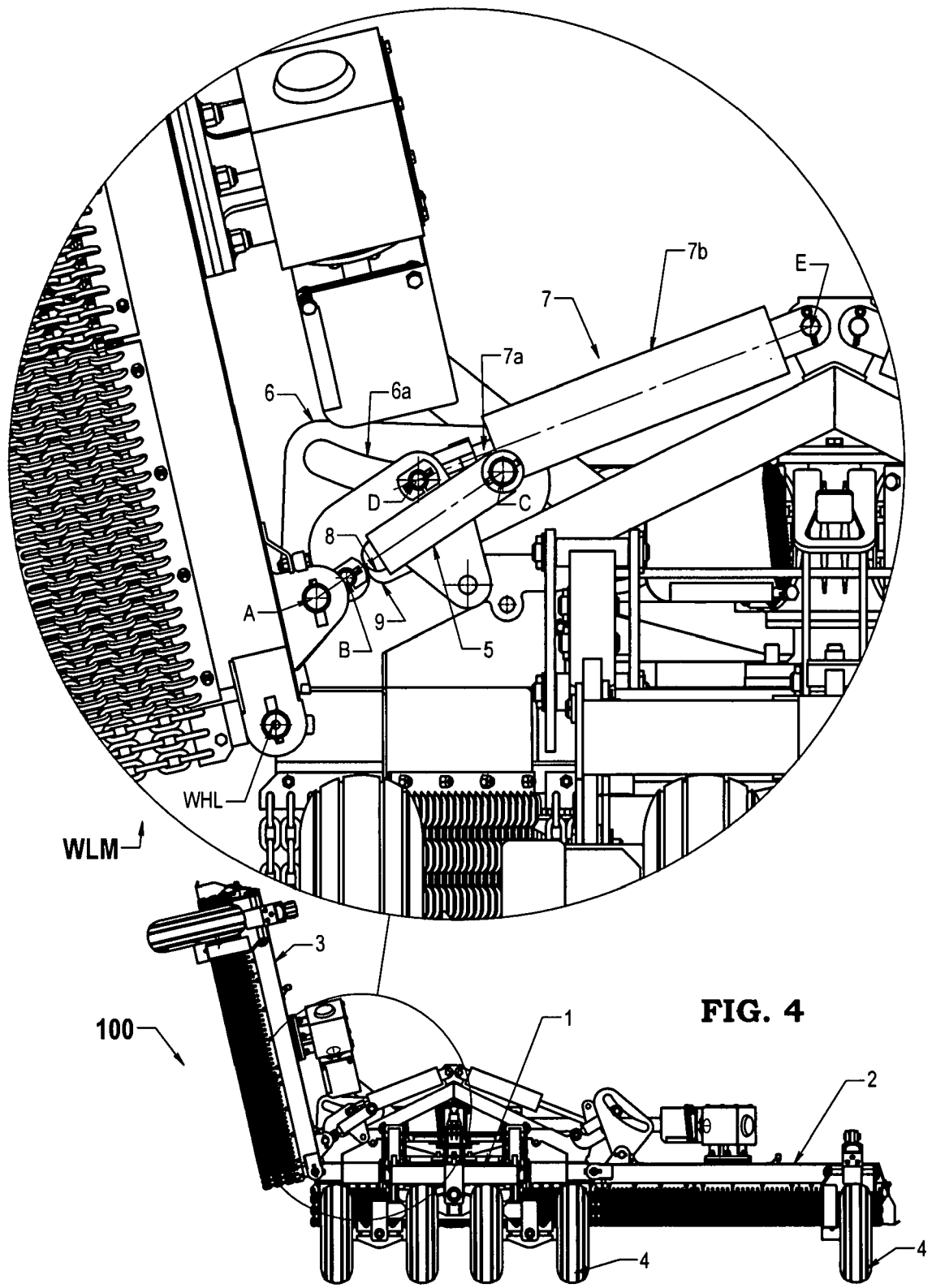
FIG. 4 is a back perspective of the embodiment of FIG. 1 showing the over-center self-locking wing lift mechanism wherein the mower is at the center (neutral) position of the movement. Detail of the mechanism is shown with one rear slotted lift link removed.
Figure 5:
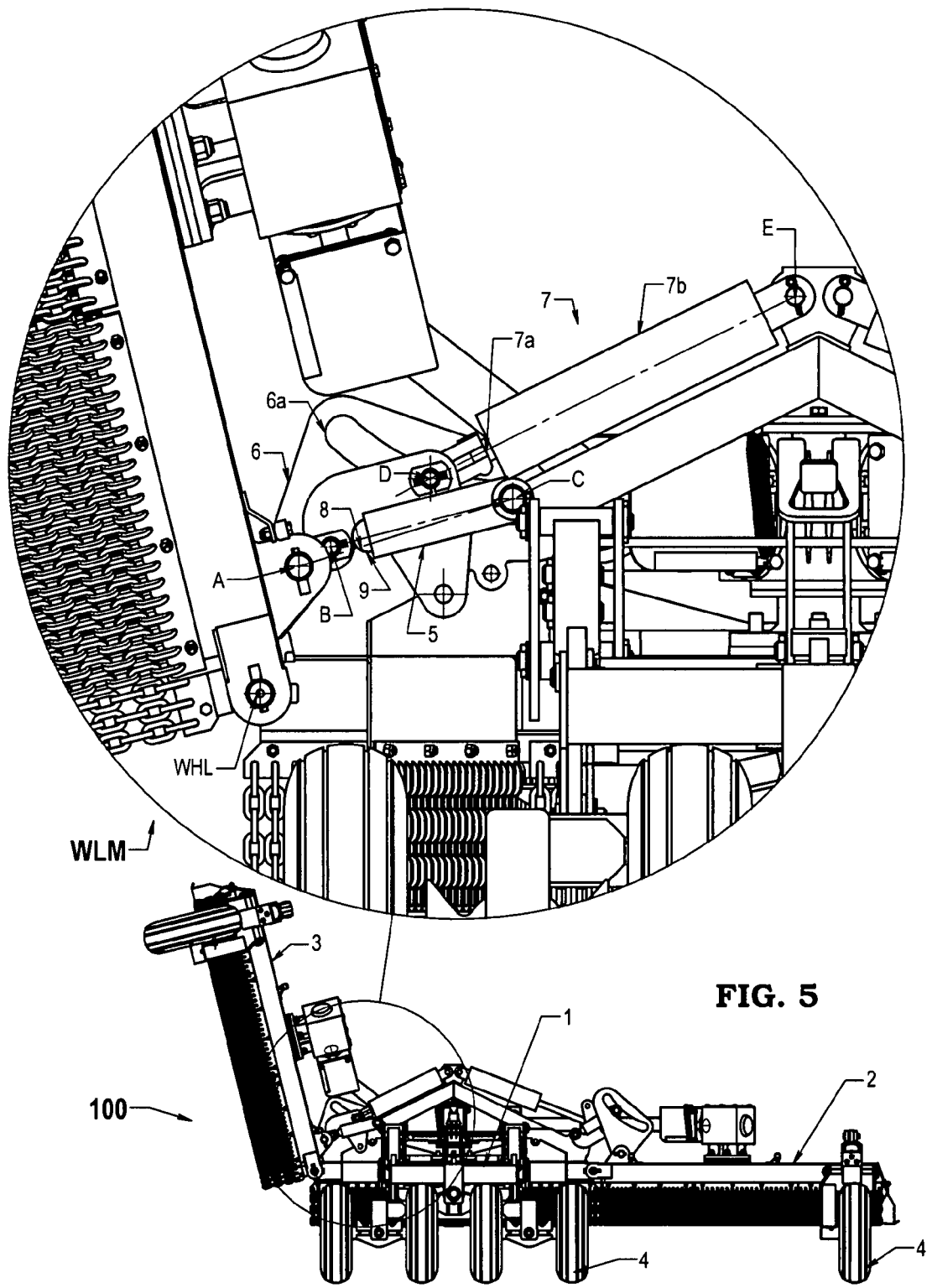
FIG. 5 is a back perspective of the embodiment of FIG. 1 showing the self-locking wing lift mechanism wherein the mower is in the over-center locked transport position. Detail of the mechanism is shown with one rear slotted lift link removed.

FIGS. 2-5 illustrate the hydraulic powered over-center self-locking wing lift mechanism WLM as it moves from the working position in FIG. 2 to the over-center locked transport position in FIG. 5. The hydraulic powered over-center self-locking wing lift mechanism WLM comprises, a double acting hydraulic cylinder 7, a bell crank 5, and a pair of slotted lift links 6. The base end 7b of the cylinder 7 is pivotally connected to a fixed pivot point E on the central mower deck 1 and the rod end 7a is pivotally connected at D on the bell crank 5. The bell crank 5 is pivotally connected at B on the central mower deck 1. The bell crank 5 is pivotally connected at C on the pair of slotted lift links 6. The slotted lift links 6 are pivotally connected to a fixed pivot A on the wing mower decks 2, 3.

FIG. 3 illustrates when the hydraulic cylinder 7 is retracted to initiate the transport position. The bell crank 5 rotates inward towards the center of the mower about the fixed central pivot B on the central mower deck 1. The movement is transferred from the bell crank 5 through the slotted lift links 6 to the wing mower deck(s) 2, 3. This rotates the wing mower deck(s) 2, 3 inward about the wing hinge axe WHA between the wing mower deck 2,3 and the central mower deck 1. The force vector between pivotal connection at C on the pair of slotted lift links 6 and the fixed pivotal connection A on the wing mower decks 2, 3 is above the fixed central pivotal connection B on the central mower deck 1. The rotational force on the bell crank 5 caused by the mass of the wing mower deck(s) 2, 3 is outward about the fixed central pivot connection B on the central mower deck 1. In this position the hydraulic cylinder 7 reacts to the force caused by the mass of the wing mower deck(s) 2, 3.

The hydraulic cylinder 7 continues to retract until the bell crank 5 reaches the center (neutral) position as illustrated in FIG. 4. The force vector between the pivotal connection C on the pair of slotted lift links 6 and the pivotal connection A on the wing mower deck(s) 2, 3 is in-line with the fixed central pivotal connection B on the central mower deck 1. The rotational force caused by the mass of the wing mower deck(s) 2, 3 on the bell crank 5 about the fixed central pivot connection B on the central mower deck 1 is zero. The reaction force on the hydraulic cylinder 7 caused by the mass of the wing mower deck(s) 2,3 is now zero.

The hydraulic cylinder 7 continues to retract until the bell crank stop shaft 8 on the bell crank 5 hits the stop seat 9 on the central mower deck 1 as illustrated in FIG. 5. The force vector between the pivotal connection A on the wing mower deck(s) 2, 3 and the pivotal connection C on the pair of slotted lift links 6 is below the central pivotal connection B on the central mower deck 1. This is the over-center position in the movement. The rotational force caused by the mass of the wing mower deck(s) 2, 3 on the bell crank 5 is inward about the fixed central pivot point connection B on the central mower deck 1 towards the center of the mower. In the over-center position the stop seat 9 on the central mower deck 1 supports the load (force) caused by the mass of the wing mower deck(s) 2, 3, effectively locking the wing mower deck(s) 2, 3 in a less then vertical position (transport position).

Extending the hydraulic cylinder 7 causes the bell crank 5 to rotate outward about the fixed pivotal connection B on the central mower deck 1 towards the wing mower deck(s) 2, 3 lifting the over-center self-locking wing lift mechanism WLM out of the locked position. When the over-center self-locking wing lift mechanism WLM passes the center position, the inward rotational force on the bell crank 5 caused by the mass of the wing mower deck(s) 2, 3 switches to an outward rotational force on the bell crank 5 about the fixed central pivotal connection B on the central mower deck 1 and the wing mower deck(s) 2,3 are lowered to the working position as illustrated in FIG. 2.

The slot 6a at the slotted lift links 6 allows the wing mower deck(s) 2, 3 to float when in the working position as illustrated in FIG. 2.

The invention thus provides a wing-type rotary mower apparatus where the wing or wings of the mower can be lifted between a working position and a locked transport position using the hydraulically powered over-center self-locking wing lift mechanism operative from the tractor seat.

The forgoing is considered illustrative only of the principles of the invention. Further since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A rotary mower apparatus adapted for attachment to a tractor for towing along the ground in an operating travel direction, the apparatus comprising:
   a central mower deck and a right and left wing mower decks pivotally attached to the respective right and left sides of the central mower deck;
   a plurality of rear wheels mounted behind the mower decks such that the mower decks ride along the ground on the wheels;
   a cutting blade element rotatably mounted under each mower deck so as to rotate about right, left, and central substantially vertical blade axes;
   two hydraulic powered over-center self-locking wing lift mechanisms pivotally attached to the left and right of the central mower deck and to the left wing mower deck and right wing mower deck to effect movement of the wings from a working position through to a center position and continuing on to the over-center locked transport position;
   where the hydraulic powered over-center self-locking wing lift mechanism comprises; a double acting hydraulic cylinder, a bell crank, a pair of slotted lift links, and a stop seat;

where the double acting hydraulic cylinder is pivotally connected at one end to an upper center fixed pivot point E on the central mower deck and at the other end is pivotally connected to the center most point D on the bell crank;

the bell crank is pivotally connected to the double acting hydraulic cylinder at its center most point D, and pivotally connected to the pair of slotted lift links at the upper most point C, and pivotally connected to the central mower deck at its lowest most point B;

the pair of lift links are pivotally connected to the bell crank at its upper most point C in a slot at the top of the lift link and the pair of lift links are pivotally connected at their bottom most point to a fixed pivot point A on the win mower deck;

where the pivotal connections on the hydraulic powered over-center self-locking wing lift mechanism between the hydraulic cylinder, bell crank, lift links, wing deck, and center deck results in an arranged path of movement when the hydraulic cylinder is retracted or extended to effect movement of the wings;

where the mass of the wing mower deck creates a force vector when the wing lift mechanism is activated between two pivot points; the fixed pivotal connection A at the slotted lift links and the wing mower deck and the pivotal connection C between the bell crank and the pair of slotted lift links; and causes a rotational force about the fixed central pivot point B on the central mower deck and bell crank.

2. The apparatus of claim 1 where the double acting cylinder of the said over-center self-locking wing lift mechanism is retracted to lift the wing mower deck from the said working position to initiate the over-center locked transport position resulting in an arranged path of movement where the fixed pivotal connection A at the pair of slotted lift links and the wing mower deck, and the pivotal connection C between the bell crank and the pair of slotted lift links align to the wing side of the fixed central pivot point B on the central mower deck and bell crank and this alignment rotates above the fixed central pivot point B on the central mower deck and bell crank.

3. The apparatus of claim 1 when the double acting cylinder of the said over-center self-locking wing lift mechanism is retracted to lift the wing mower deck from the said working position to initiate the said over-center locked transport position; this causes the bell crank to rotate inward towards the center of the apparatus about the said fixed central pivot point B on the central mower deck; where the movement is transferred from the bell crank through the pair of slotted lift links to the wing mower deck; which rotates the wing mower deck inward about the pivotal attachment between the wing mower deck and the central mower deck; and where the mass of the wing mower deck creates a force vector between the said pivotal connection C at the pair of slotted lift links and bell crank and the said fixed pivotal connection A at the pair of slotted lift links and wing mower deck, and this force vector rotates above the fixed central pivotal connection B on the central mower deck and bell crank;

where the said bell crank has an outward rotational force about the said fixed central pivotal connection B on the center mower deck caused by the mass of the wing mower deck; and where the said double acting hydraulic cylinder reacts to the said rotational force on the bell crank caused by the mass of the wing mower deck.

4. The apparatus of claim 1 where the said double acting hydraulic cylinder retracts until the said over-center self-locking wing lift mechanism reaches the center position;

where the said force vector between the pivotal connections C on the slotted lift link and the bell crank and the pivotal connections A at the slotted lift link and the wing mower deck is aligned with the fixed central pivotal connection B on the central mower deck and the bell crank;

where the said bell crank has zero rotational force about the fixed central pivotal connections B on the center mower deck and the bell crank created by the mass of he wing mower deck, and where the double acting hydraulic cylinder reacts to the zero rotational force on the bell crank caused by the mass of the wing mower deck.

5. The apparatus of claim 1 where the said double acting cylinder of the said over-center self-locking wing lift mechanism retracts until the center position is reached, resulting in an arranged path of movement between the said pivotal connections; where the pivotal connection C on the slotted lift link and the bell crank and the pivotal connection A at the slotted lift link and the wing mower deck, is in-line with the central pivotal connection B on the central mower deck and bell crank.

6. The apparatus of claim 1 where the said double acting cylinder retracts until the over-center self-locking wing lift mechanism reaches the over-center locked position where the said bell crank hits the stop seat on the central mower deck locking the wing mower deck in the over-center locked transport position;

where the said force vector between the pivotal connection C on the slotted lift link and the bell crank and the pivotal connection A at the bottom of the slotted lift link and the wing mower deck is aligned below the fixed central pivotal connection B on the central mower deck and the bell crank;

where the said bell crank has an inward rotational force about the central pivotal connection B on the central mower deck and the bell crank caused by the mass of the wing mower deck; and where the stop seat on the central mower deck supports the said rotational force caused by the mass of the wing mower deck.

7. The apparatus of claim 1 where the said double acting cylinder retracts until the over-center self locking wing lift mechanism reaches the over-center locked position where the said bell crank hits the stop seat on the central mower deck locking the wing mower deck in the over-center locked transport position;

resulting in an arranged path of movement between the pivotal connection where the pivotal connection C on the slotted lift link and the bell crank and the fixed pivotal connection A at the bottom of the pair of slotted lift links and the wing mower deck, align below the fixed central pivotal connection B on the central mower deck and the bell crank.

8. The apparatus of claim 1 when the hydraulic powered over-center self-locking wing lift mechanism moves out of the over-center locked transport position towards the working position; the said double acting hydraulic cylinder extends causing the bell crank to rotate outward about the fixed central pivotal connection B on the central mower deck and bell crank, lifting the bell crank away from the said stop seat when the said mechanism passes the said center position, the inward rotational force on the bell crank about the central pivotal connection B on the central mower deck and the bell crank switches to an outward rotational force about the central pivotal connection B on the central mower deck and the bell crank; and the wing mower deck is lowered to the said working position.

9. The apparatus of claim 1 where the said over-center self-locking wing lift mechanism is operative from the tractor.

10. The apparatus of claim 1 where the said slot on the slotted lift link allows the wing mower deck to float in the working position.

11. The apparatus of claim 1 where the hydraulic powered over-center self-locking wing lift mechanism moves out of the over-center locked transport position towards the working position; the said double acting hydraulic cylinder extends causing the bell crank to rotate outward about the fixed central pivotal connection B on the central mower deck and the bell crank, lifting the bell crank away from the stop seat, when the said mechanism passes the center position the arranged movement between the fixed pivotal connection A at the pair of slotted lift links and the wing mower deck, and the pivotal connection C between the pair of lift links and the bell crank changes from being aligned below the fixed central pivotal connection B on the central mower deck and bell crank to aligning above the fixed central pivotal connection B on the central mower deck and bell crank; and the wing mower deck is lowered to the said working position.

* * * * *